(12) United States Patent
Kim et al.

(10) Patent No.: US 7,319,660 B2
(45) Date of Patent: Jan. 15, 2008

(54) DEVICE AND METHOD FOR SYMBOL FRAME SYNCHRONIZATION OF OFDM TRANSMITTER AND RECEIVER

(75) Inventors: Ki-yun Kim, Kwangmyeong-si (KR); Ho Kim, Seoul (KR); Jun-yun Lee, Uiwang-si (KR); Hyung-jin Choi, Seoul (KR)

(73) Assignee: Samsung Thales Co., Ltd., Gumi, Kyungsangbuk-do (KR)

( * ) Notice: Subject to any disclaimer, the term of this patent is extended or adjusted under 35 U.S.C. 154(b) by 1066 days.

(21) Appl. No.: 10/412,262

(22) Filed: Apr. 14, 2003

(65) Prior Publication Data

US 2003/0193970 A1   Oct. 16, 2003

(30) Foreign Application Priority Data

Apr. 15, 2002   (KR) ...................... 10-2002-0020418

(51) Int. Cl.
*H04J 11/00*   (2006.01)

(52) U.S. Cl. ..................... 370/208; 370/210; 370/509

(58) Field of Classification Search ..................... None
See application file for complete search history.

(56) References Cited

U.S. PATENT DOCUMENTS

| | | | |
|---|---|---|---|
| 6,208,695 B1 | 3/2001 | Klank et al. | |
| 6,389,087 B1 | 5/2002 | Heinonen et al. | |
| 6,408,038 B1 | 6/2002 | Takeuchi | |
| 6,501,810 B1 | 12/2002 | Karim et al. | |
| 6,965,617 B2* | 11/2005 | Hasegawa et al. | 370/503 |
| 7,170,884 B1* | 1/2007 | Radimirsch et al. | 370/350 |
| 2002/0004920 A1 | 1/2002 | Cho et al. | |
| 2002/0126618 A1 | 9/2002 | Kim | |
| 2002/0191533 A1 | 12/2002 | Chini et al. | |
| 2003/0007576 A1 | 1/2003 | Alavi et al. | |
| 2004/0213145 A1* | 10/2004 | Nakamura | 370/208 |

* cited by examiner

*Primary Examiner*—Doris H. To
*Assistant Examiner*—Christopher Grey
(74) *Attorney, Agent, or Firm*—Robert E. Bushnell, Esq.

(57) ABSTRACT

Provided is a frame synchronization pattern design and synchronization method by which in a transmitter of a communications system employing an orthogonal frequency division multiplexing (OFDM), a frame synchronization pattern is inserted into the starting part of a symbol frame, and by detecting the frame synchronization pattern in a receiver, synchronization of the OFDM transmitter and receiver is performed. Also, provided are a transmitter synchronization apparatus including an OFDM symbol frame generation unit, a frame synchronization pattern insertion unit, and an OFDM transmission signal conversion unit, and a receiver synchronization apparatus comprising a frame synchronization pattern inserted OFDM symbol frame conversion unit, a frame synchronization pattern detection unit, and a source data generation unit.

Overcoming the conventional notion depending on the earlier art OFDM symbol standards, the OFDM symbol frame start detection method according to the present invention places a free-length code pattern, which is separately generated in a time domain, in the starting point of a frame and detects this pattern such that accuracy and efficiency greatly improve. Also, since the power value of a received signal is detected in the method, the communications system operates regardless of the frequency offset and phase offset. In addition, since a free-length pattern can be designed, the start point of a frame can be accurately detected in a seriously fading channel, by detecting a maximum peak based on correlation.

7 Claims, 17 Drawing Sheets

RECEPTION CHARACTERISTIC OF CHANNEL I

RECEPTION CHARACTERISTIC OF CHANNEL Q

DEVICE AND METHOD FOR SYMBOL FRAME SYNCHRONIZATION OF OFDM TRANSMITTER AND RECEIVER

CLAIM OF PRIORITY

This application makes reference to, incorporates the same herein, and claims all benefits accruing under 35 U.S.C. §119 from an application for DEVICE AND METHOD FOR SYMBOL FRAME SYNCHRONIZATION OF OFDM TRANSMITTER AND RECEIVER earlier filed in the Korean Intellectual Property Office on Apr. 15, 2002 and there duly assigned Ser. No. 2002-20418.

BACKGROUND OF THE INVENTION

1. Field of the Invention

The present invention relates to a frame synchronization pattern design and synchronization method, by which in a transmitter of a communications system employing an orthogonal frequency division multiplexing (OFDM), a frame synchronization pattern is inserted into the starting part of a symbol frame, and by detecting the frame synchronization pattern in a receiver, synchronization of the OFDM transmitter and receiver is performed.

2. Description of the Related Art

The frame structure of a communications system employing an orthogonal frequency division multiplexing (OFDM) can be broken down into a broadcasting type and a burst type according to the objects of application. In the broadcasting type, since data are continuously received, in order to increase data efficiency a synchronization symbol for symbol frame synchronization is not used. Instead, by using data orthogonal frequency division multiplexing symbols having random patterns, the start point of an OFDM symbol is detected. Meanwhile, in the OFDM burst type that has been used in wireless LAN (local area network) and other applications in recent years, data are not continuously transmitted and are transmitted in units of frames at independent time points. Accordingly, detection of the starting point of a symbol frame should be performed under a situation where frequency offset compensation and channel equalization are not performed. The present invention relates to a symbol pattern design for symbol frame synchronization and a synchronization method using the same that can fit the burst-type transmission method which needs individual frame synchronization for each frame in the OFDM communications system.

The theory on the OFDM, which divides an input bit stream, modulates a plurality of carrier waves corresponding to respective divided parts of the bit stream, and transmits the carrier waves in parallel, has been studied since 1950s but due to complexity in implementation it had not been widely put into practical use. Recently, however, with developments of digital signal processing technologies, such as fast Fourier transform (FFT), and very large scale integration (VLSI) technologies, the major problems of the multiple carrier modulation field in the initial stage, including the huge amount of calculation and demands for use of memories operating at high speed and use of oscillators generating multiple harmonic waves, have been solved. Also, due to the inherent potential advantages of the multiple carrier modulation, including the strong properties against frequency selective fading, capability to make a transmission capacity close to a channel capacity, and ability to guarantee an efficient transmission without a complex equalizer in a channel where inter-symbol interference (ISI) is serious, researches and developments are actively performed and the application range increases gradually.

The OFDM method, a kind of multiple carrier modulation method, had been used only in expensive digital data transmission systems a long while in the initial stage. From the beginning of the 80s, the OFDM method has been adopted as the European digital audio broadcasting (DAB) method and as the European digital video broadcasting for terrestrial (DVB-T) method. Then, International Telecommunications Union-Telecommunication (ITU-T) determined a discrete multi-tone (DMT), which is similar to the OFDM, as standard transmission method for an asymmetric digital subscriber line (ADSL) and a universal ADSL (UADSL). Also, research and developments are actively performed in the wireless local area network (LAN) field such as the US (United States) IEEE 802.11 a (a standard set by the Institute of Electrical and Electronics Engineers) and Europe's broadband radio access network (BRAN), and in a multi-carrier CDMA (MC-CDMA) that connects the OFDM and a code division multiple access (CDMA) method.

The OFDM effectively transmits data by using a plurality of subcarrier waves in the bandwidth of a channel. The subcarrier waves are constructed to maximize the band efficiency, compared to the transmission methods such as frequency division multiplexing (FDM). In the FDM method, the band efficiency is low because subcarrier waves are in different frequency bands and a frequency guard band is arranged so that interference between subcarrier waves can be prevented. However, in the OFDM method, subcarrier waves overlap in a frequency domain with each other such that the band efficiency is maximized, while the orthogonal characteristic is maintained so that other subcarrier waves become null (values are '0') in the central frequency of each subcarrier and interference between subcarrier waves can be prevented.

In the OFDM method, an input signal desired to be transmitted is first converted into multiple low-speed parallel signals in a serial-to-parallel conversion, and then each of the low-speed parallel input signals is modulated into a carrier wave that is in an orthogonal relation with the low-speed parallel signal. The OFDM method is implemented by using inverse fast Fourier transform (IFFT) in a transmission terminal and fast Fourier transform (FFT) in a reception terminal. If the cycle (=1/transmission speed) of each of parallel signals is made to be longer than delay diffusion occurring by multiple path delay when the OFDM is used in fading channel matching for wireless terrestrial broadcasting and the likes, the parallel signal will have a characteristic which is obtained after passing through a frequency non-selective fading channel. Accordingly, by setting an appropriate guard interval, degradation of transmission capability by fading is effectively prevented. In addition, in the OFDM method, data in the form of a bit stream are transmitted in parallel in order to satisfy the demands for transmission of high speed data such as a broadcasting signal, and by doing so the frequency bands are efficiently used and transmission speed increases.

In a earlier art OFDM symbol frame synchronization method, the correlation between a guard interval and the latter half of a symbol is used based on the OFDM symbol of an IFFT output. However, in this method, it is difficult to detect an accurate starting point of a symbol in a multiple path channel environment. That is, inter symbol interference (ISI) occurs and makes the guard interval region different from the latter half of the symbol such that the performance of the method is degraded. Accordingly, in the earlier art method using the guard interval, if the starting point of the symbol in the guard interval is roughly placed, a phase offset occurred by inaccuracy of the symbol starting time is compensated for by an equalizer. However, this rough detection of the starting point causes degradation of performance in using a frequency synchronization algorithm employing the guard interval.

Also, there is a method in which OFDM symbol frame synchronization is performed using a pilot. However, since channel equalization is not performed in this method, the pilot itself cannot be depended on in a channel environment where noise is serious.

SUMMARY OF THE INVENTION

To solve the above and other problems, it is an objective of the present invention to provide an apparatus and method in which, overcoming the conventional notion depending on the earlier art OFDM symbol standards in the OFDM symbol synchronization technologies, a free-length code pattern, which is separately generated in a time domain, is placed in the starting point of a frame and by receiving and detecting the pattern, synchronization between a transmitter and a receiver is performed.

It is another object to provide an apparatus and method of a symbol frame synchronization of an orthogonal frequency division multiplexing transmitter and receiver that is more efficient.

It is still another object to provide an apparatus and method of a symbol frame synchronization of an orthogonal frequency division multiplexing (OFDM) transmitter and receiver where the communications system operates regardless of the frequency offset and phase offset since a power value of a received signal is detected.

It is yet another object to provide an apparatus and a method of a transmitter and receiver using a burst-type transmission method where the starting point of a frame can be accurately detected in a seriously fading channel, by detecting a maximum peak based on correlation since a free-length pattern can be designed.

According to an aspect of the present invention, there is provided an apparatus for symbol frame synchronization of an orthogonal frequency division multiplexing (OFDM) transmitter including an OFDM symbol frame generating unit which generates an OFDM symbol frame from source data; a frame synchronization pattern insertion unit which generates a frame synchronization pattern and inserts the pattern in the front part of the OFDM symbol frame; and an OFDM transmission signal conversion unit which converts the OFDM symbol frame, into which the frame synchronization pattern is inserted, into an OFDM transmission signal.

According to another aspect of the present invention, there is provided an apparatus for symbol frame synchronization of an orthogonal frequency division multiplexing (OFDM) receiver including a frame synchronization pattern inserted OFDM symbol frame conversion unit which converts an OFDM reception signal into an OFDM symbol frame, into which a frame synchronization pattern is inserted; a frame synchronization pattern detection unit which detects the frame synchronization pattern and sends the OFDM symbol frame excluding the frame synchronization pattern; and a source data generation unit which generates source data from the OFDM symbol frame.

According to another aspect of the present invention, there is provided a method for symbol frame synchronization of an orthogonal frequency division multiplexing (OFDM) transmitter including (a) generating an OFDM symbol frame from source data; (b) generating a frame synchronization pattern and inserting the pattern in the front part of the OFDM symbol frame; and (c) converting the OFDM symbol frame, into which the frame synchronization pattern is inserted, into an OFDM transmission signal.

According to another aspect of the present invention, there is provided a method for synchronization of an orthogonal frequency division multiplexing (OFDM) receiver including (a) converting an OFDM reception signal into an OFDM symbol frame, into which a frame synchronization pattern is inserted; (b) detecting the frame synchronization pattern and sending the OFDM symbol frame excluding the frame synchronization pattern; and (c) generating source data from the OFDM symbol frame.

According to another aspect of the present invention, there is provided a computer-readable medium having embodied thereon a computer program for the above methods.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
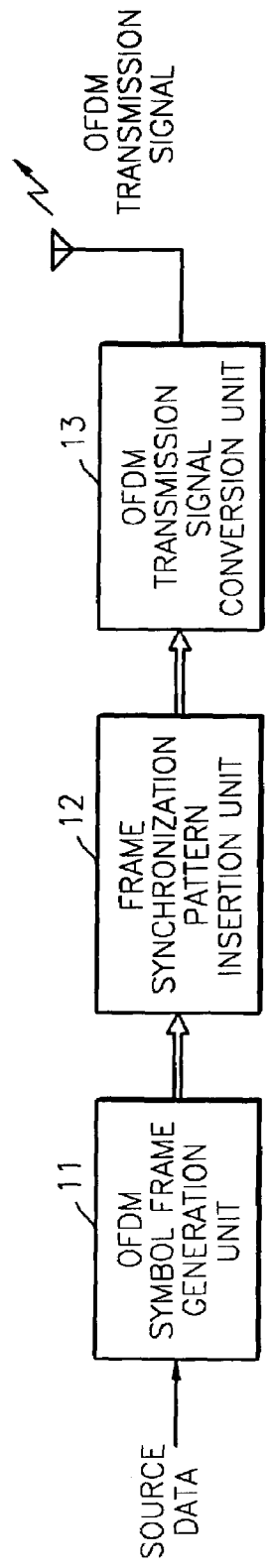
FIG. 1 is a diagram of the structure of an orthogonal frequency division multiplexing (OFDM) transmitter symbol frame synchronization apparatus.

FIG. 1 is a diagram of the structure of a transmitter symbol frame synchronization apparatus which synchronizes an orthogonal frequency division multiplexing (OFDM) transmitter with an OFDM receiver by inserting a frame synchronization pattern.

Unlike in an ordinary OFDM transmitter, the transmitter symbol frame synchronization apparatus according to the present invention inserts a frame synchronization pattern (FSP) in the front part of a frame in a time domain. For the OFDM, an OFDM symbol frame generation unit 11 collects a predetermined number of bits of digital source data formed of 1's and 0's and generates OFDM type symbols to transmit the bits as a signal. A predetermined number of the various OFDM symbols are collected and then form one frame.

In order to easily perform symbol frame synchronization of the OFDM transmission and reception system, a frame synchronization pattern insertion unit 12 inserts a frame synchronization pattern which is determined by the user in advance, in the front part of the OFDM symbol frame. An OFDM transmission signal conversion unit 13 converts the OFDM symbol frame into a high frequency analog transmission signal so that the OFDM symbol frame can be demodulated after the OFDM symbol frame is transmitted and then received by the OFDM receiver.

Figure 2:
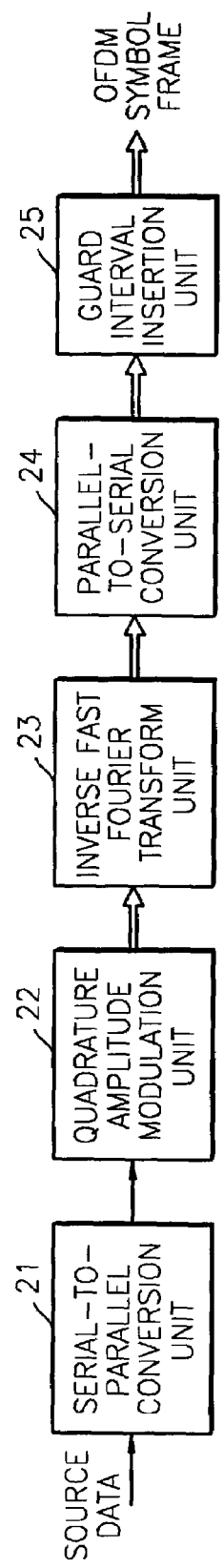
FIG. 2 is a detailed diagram of the structure of an OFDM symbol frame generation unit.

FIG. 2 is a detailed diagram of the structure of the OFDM symbol frame generation unit for generating OFDM type symbols from digital source data which the OFDM communications system user desires to transmit.

A serial-to-parallel conversion unit 21 cuts the source data formed by serially arranged 1's and 0's into unit amounts, each of which can be transmitted in one transmission, and converts the source data into a parallel signal.

A quadrature amplitude modulation (QAM) unit 22 performs quadrature amplitude modulation of the converted parallel signal. The QAM modulates a digital signal in amplitude and phase and is used to increase transmission efficiency.

The OFDM is a technology that can effectively transmit data by using a plurality of subcarrier waves in the bandwidth of a channel. The plurality of subcarrier waves are constructed so that bandwidth efficiency can be maximized compared to the transmission methods such as the FDM. In the FDM method, the band efficiency is low because subcarrier waves are in different frequency bands and a frequency guard band is arranged so that interference between subcarrier waves can be prevented. However, in the OFDM method, the orthogonal characteristic is maintained SO that other subcarrier waves become null (values are '0') in the central frequency of each subcarrier and interference between subcarrier waves can be prevented. An inverse fast Fourier transform (IFFT) unit 23 performs IFFT on the QAM modulated signal in order to implement the orthogonal characteristic.

A parallel-to-serial conversion unit 24 converts the IFFT transformed parallel signal into a serial signal that can be transmitted sequentially.

When the signal transmitted by the transmitter arrives at the receiver, reflection signals occur by adjacent ground objects such that signals having thus occurred time differences are received. In the OFDM method, a guard interval (GI) is allocated between two signals that are transmitted continuously. If the delay time of the delayed signal is not longer than the guard interval, the orthogonal characteristic of the OFDM symbol signal is maintained and performance degradation can be prevented. An insertion unit 25 inserts a guard interval considering the signal delay, into the signal that is converted into a parallel signal. By proceeding to the insertion unit 25, OFDM symbols the same as the earlier art OFDM symbols are formed and by packing a predetermined number of OFDM symbols, a frame is formed.

Figure 3:
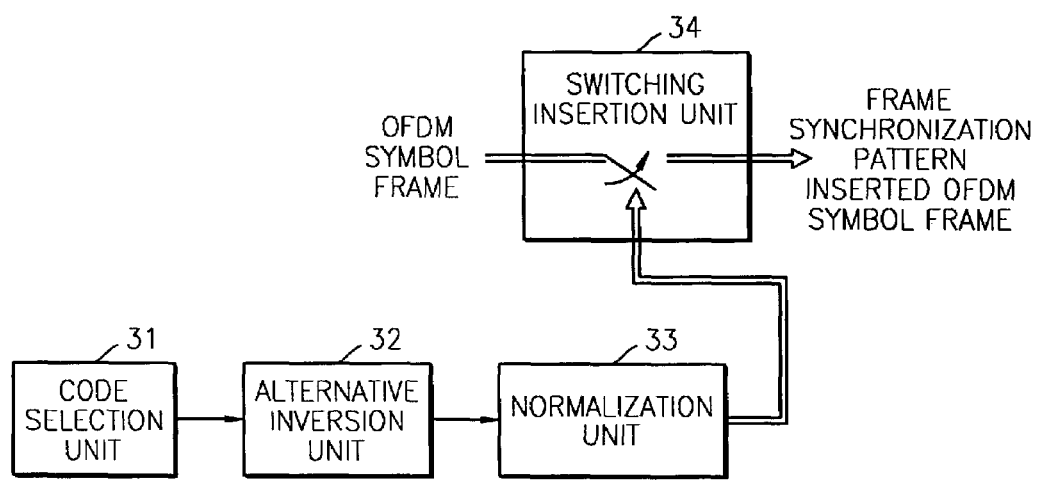
FIG. 3 is a detailed diagram of the structure of a frame synchronization pattern insertion unit.

FIG. 3 is a detailed diagram of the structure of the frame synchronization pattern insertion unit which inserts a frame synchronization pattern into the OFDM symbol frame for symbol frame synchronization between the transmitter and receiver.

First of all, for burst transmission symbol frame synchronization, a frame synchronization pattern in a time domain should be generated. A code selection unit 31 first selects a binary code having a good correlation characteristic. A code having a good correlation characteristic is selected and the length of the code should be adjusted according to the state of a channel environment including the noise ratio. If the channel environment is seriously bad and the bit error rate (BER) is high, the length of the code is designed to be longer. In a preferred embodiment of the present invention, a pseudo noise (PN) code is used as the binary code. This code has a characteristic of 2N−1 and has balanced numbers of 0's and 1's.

Figure 4:
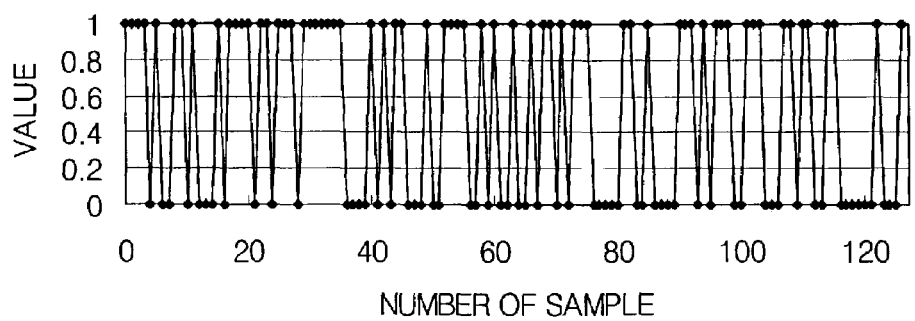
FIG. 4 is a graph of a selected pseudo noise (PN) code binary value having a 127-bit length.

FIG. 4 is a graph of the selected PN code binary value having a 127-bit length.

An alternative inversion unit 32 performs alternative inversion on the binary 1's of the code. While keeping binary 0's without change, the alternative inversion alternately inserts a binary 1 having a polarity opposite to the polarity of an immediately preceding binary 1. For example, if the binary code is {1,0,0, 1,1,1,0, . . .}, the binary code is converted into a 3-level signal (−1,0,1) of {1,0,0,1,1,−1,0,0 . . . }.

Figure 5:
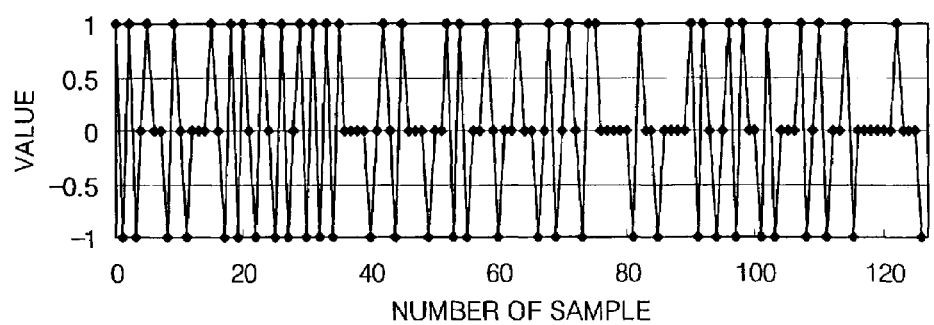
FIG. 5 is a graph showing the resulting values of alternative inversion of FIG. 4.

FIG. 5 is a graph showing the resulting values of the alternative inversion. Referring to FIG. 5, the resulting values are made with total 3 levels of −1, 0, and 1, which can be used in a DC offset remover and auto gain control (AGC). That is, since the numbers of 1's and −1's are the same, the code is transmitted without a DC offset and can determine the dynamic range of a signal.

According to the average power and dynamic range of a signal to be transmitted, a normalization unit 33 normalizes the power of the signal, on which the alternative inversion is performed as shown in FIG. 5, when the signal is inserted in a time domain. The signal normalized through the normalization unit 33 is the frame synchronization pattern to be inserted in the front part of the OFDM symbol frame.

In order to insert the frame synchronization pattern for a frame synchronization pattern interval, a switching insertion unit 34 turns on a switch for the frame synchronization pattern interval, inserts the frame synchronization pattern in the front part of the OFDM symbol frame of a real number I channel and an imaginary number Q channel, and transmits the pattern.

Figure 6:
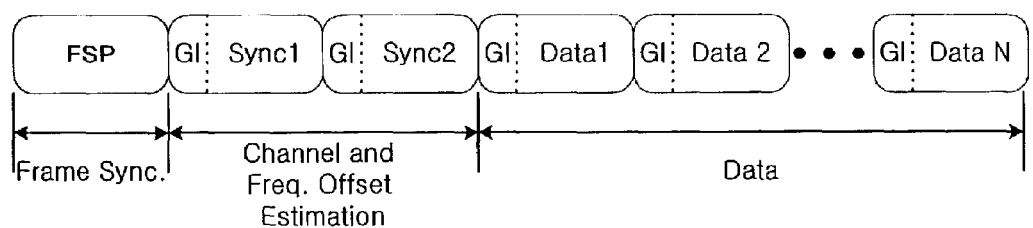
FIG. 6 is a diagram of the structure of an OFDM symbol frame formed by inserting a frame synchronization pattern.

FIG. 6 is a diagram of the structure of an OFDM symbol frame formed by inserting the frame synchronization pattern.

In the earlier art method, for symbol frame synchronization a signal is generated in a frequency domain and by performing IFFT on the signal, an OFDM symbol is obtained and used. Meanwhile, in the OFDM method according to the present invention, a frame synchronization is pattern which is designed to have a free-length in a time domain is inserted before transmitting OFDM data and then transmits the OFDM data. Accordingly, the frame synchronization pattern does not need an additional guard interval and the length of the pattern can be designed regardless of the length of the OFDM symbol. In the receiver side, the frame synchronization pattern that is the initial region of the frame is first received and detected, and using the following synchronization patterns, Sync 1 and Sync 2, channel and frequency offsets are compensated for, and then the data is received.

Figure 7:
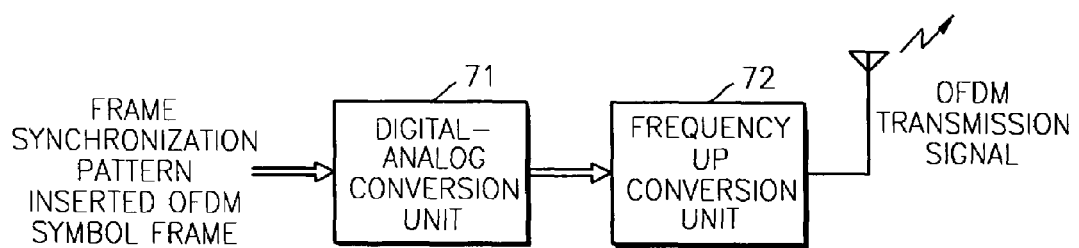
FIG. 7 is a detailed diagram of the structure of an OFDM transmission signal conversion unit.

FIG. 7 is a detailed diagram of the structure of the OFDM transmission signal conversion unit 13 which converts the OFDM symbol frame, into which the frame synchronization pattern is inserted, into an OFDM transmission signal.

Figure 8:
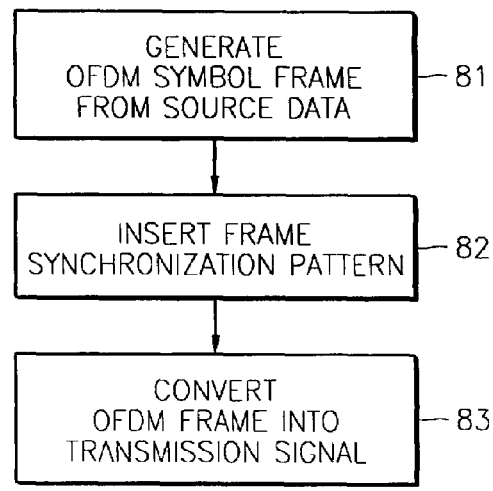
FIG. 8 is a flowchart of a process for synchronization of an OFDM transmitter.

A digital-to-analog conversion unit 71 which converts a digital signal into an analog signal converts the OFDM symbol frame, into which the frame synchronization pattern is inserted, into an analog signal. A frequency up conversion unit 72 converts the signal, which is converted into an analog signal, into a high frequency signal in order to transmit the signal in a predetermined band after being loaded on a carrier wave FIG. 8 is a flowchart of a process for symbol frame synchronization of an OFDM transmitter which synchronizes the OFDM transmitter with the OFDM receiver by inserting a frame synchronization pattern.

In order to transmit a predetermined number of bits as one signal after collecting the bits from the digital source data formed with 1's and 0's, an OFDM symbol is generated in step 81. In order to easily perform synchronization of the OFDM system, the frame synchronization pattern that is determined by the user in advance is inserted into the front part of the OFDM symbol frame in step 82. The OFDM symbol frame is converted into a high frequency analog transmission signal in step 83 so that the OFDM symbol frame can be transmitted and received by the OFDM receiver, and then demodulated.

Figure 9:
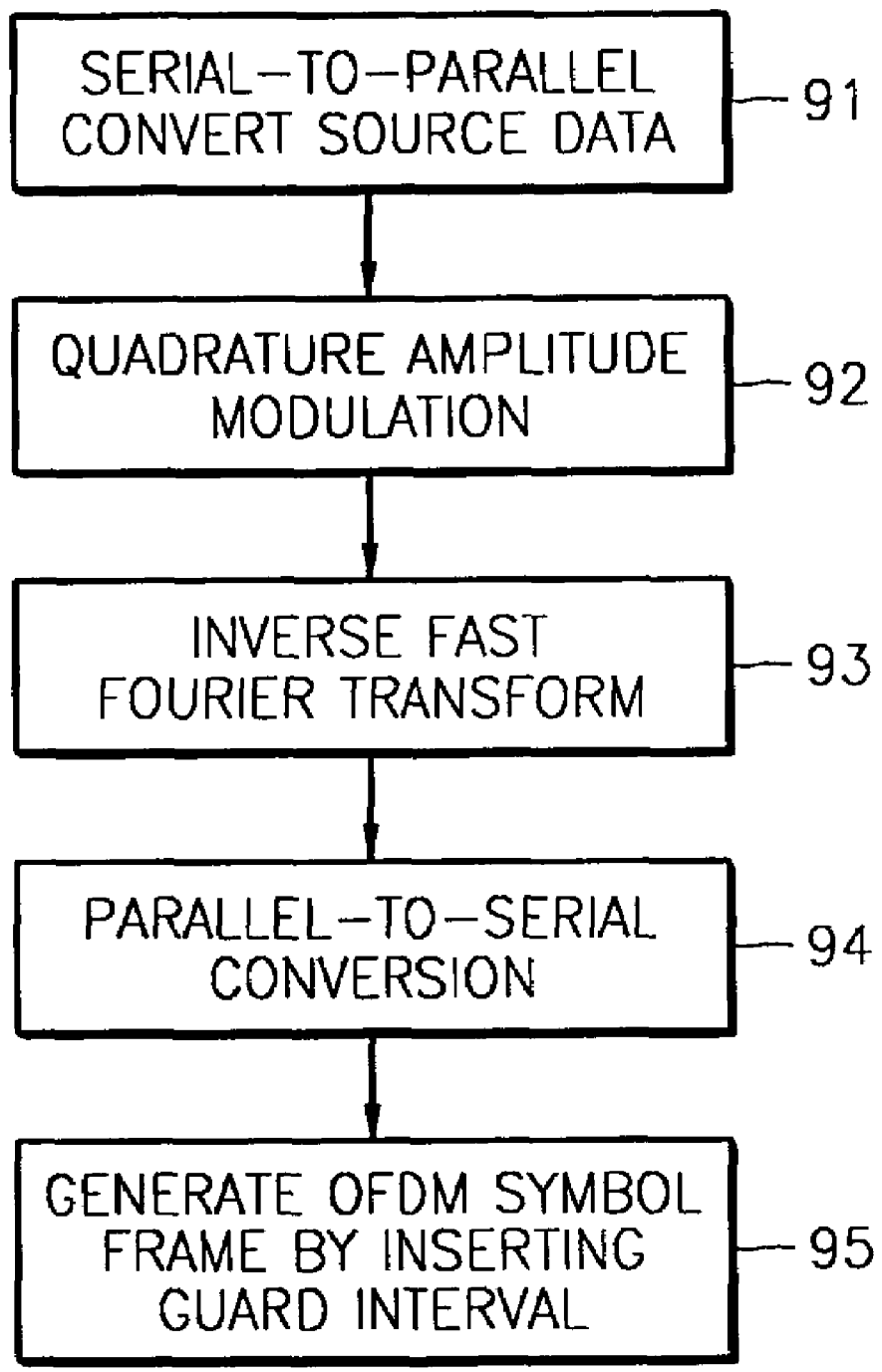
FIG. 9 is a detailed flowchart of a process for converting an OFDM symbol frame.

FIG. 9 is a detailed flowchart of the step 81 for generating the OFDM symbol from the digital source data desired to be transmitted by the OFDM user.

Source data formed with serially arranged 0's and 1's are cut into unit amounts, each of which can be transmitted in one transmission, and converted into a parallel signal in step 91. Quadrature amplitude modulation (QAM) is performed on the signal converted into a parallel signal in step 92. In order to implement the orthogonal characteristic, IFFT is performed on the QAM modulated signal in step 93. The IFFT transformed parallel signal is converted into a serial signal that can be sequentially transmitted in step 94. A guard interval is inserted into the serial signal in step 95 to generate the OFDM symbol frame.

Figure 10:
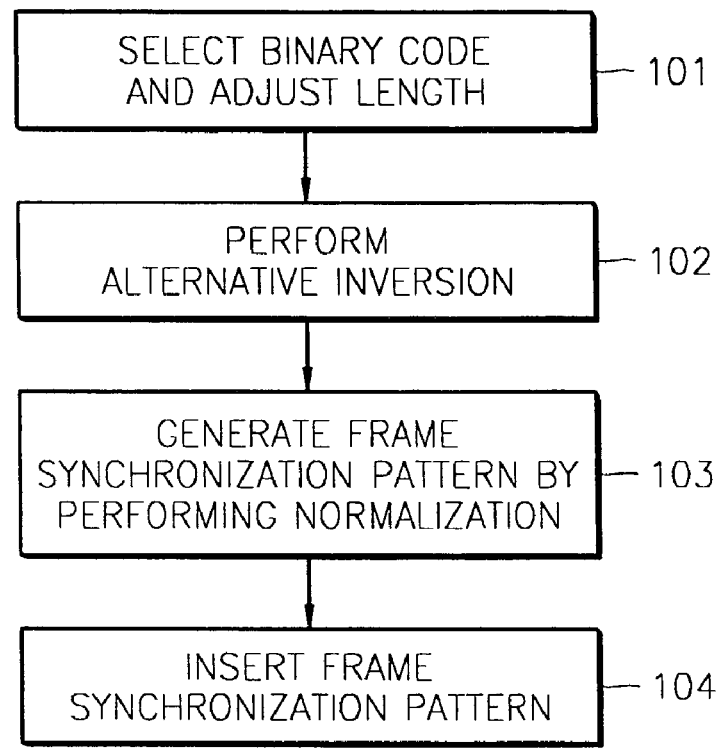
FIG. 10 is a detailed flowchart of a process for inserting a frame synchronization pattern.

FIG. 10 is a detailed flowchart of the step 82 for inserting the frame synchronization pattern into the OFDM symbol frame for symbol frame synchronization between the transmitter and receiver.

A binary code having a good correlation characteristic is selected and the length of the code is adjusted according to the state of the channel environment including a noise ratio, in step 101. Alternative inversion is performed on the binary 1's of the selected code in step 102. A frame synchronization pattern is generated in step 103 by normalizing the signal power according to the average power and dynamic range of the signal to be transmitted when the alternatively inverted signal is inserted in a time domain. In order to insert the frame synchronization pattern for a frame synchronization pattern interval, a switch is turned on for the frame synchronization pattern interval, and the frame synchronization pattern is inserted in the front part of the OFDM symbol frame of a real number I channel and an imaginary number Q channel, and transmitted in step 104.

Figure 11:
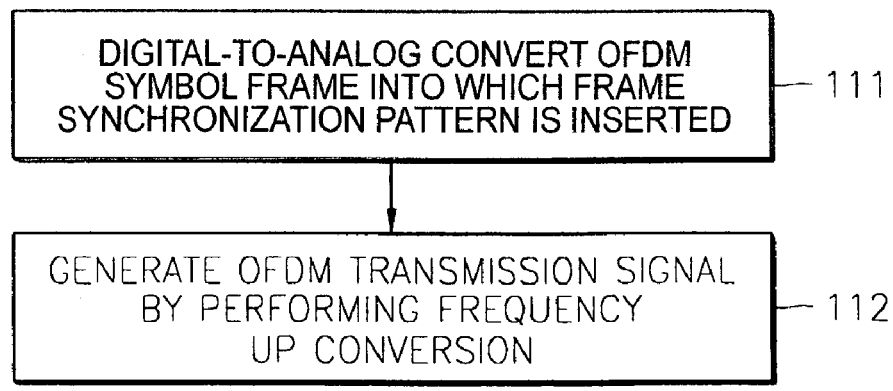
FIG. 11 is a detailed flowchart of a process for converting an OFDM transmission signal.

FIG. 11 is a detailed flowchart of the step 83 for converting the OFDM transmission signal, into which the frame synchronization pattern is inserted, into an OFDM transmission signal that can be demodulated by the receiver.

In order to convert the OFDM symbol frame, into which the frame synchronization pattern is inserted, into an analog signal, the digital OFDM symbol frame is converted into an analog signal in step 111. The analog-converted signal is converted into a high frequency signal in step 112 so that the signal can be loaded on a carrier wave and transmitted in a predetermined band.

Figure 12:
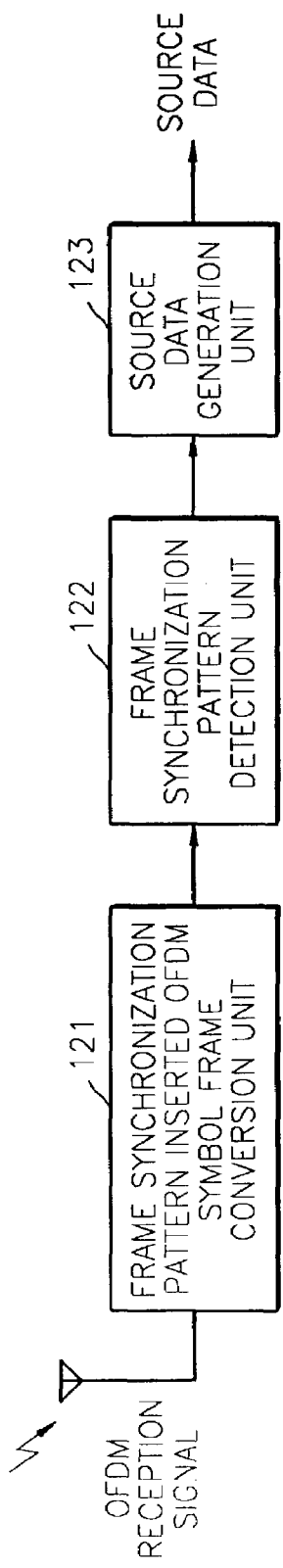
FIG. 12 is a diagram of the structure of an OFDM receiver symbol frame synchronization apparatus.

FIG. 12 is a diagram of the structure of an OFDM receiver symbol frame synchronization apparatus which detects the frame synchronization pattern and synchronizes the OFDM transmitter with the OFDM receiver.

Compared to an ordinary OFDM receiver, an apparatus which detects the frame synchronization pattern is additionally needed. However, other OFDM receivers also need synchronization element function blocks for frame symbol synchronization and when this is considered, the present invention does not have an additional circuit design workload.

A frame synchronization pattern inserted OFDM symbol frame conversion unit 121 converts the high frequency analog OFDM transmission signal into a low frequency digital signal that can be processed in the receiver, when the high frequency analog OFDM transmission signal transmitted by the OFDM transmitter is sensed by the OFDM receiver. A frame synchronization pattern detection unit 122 detects the frame synchronization pattern in the frame synchronization pattern inserted OFDM symbol frame, and sends only the OFDM symbol frame to the next module excluding the frame synchronization pattern. A source data generation unit 123 generates source data input by the user, by performing fast Fourier transform (FFT), quadrature amplitude demodulation and other processes on the OFDM symbol frame.

Figure 13:
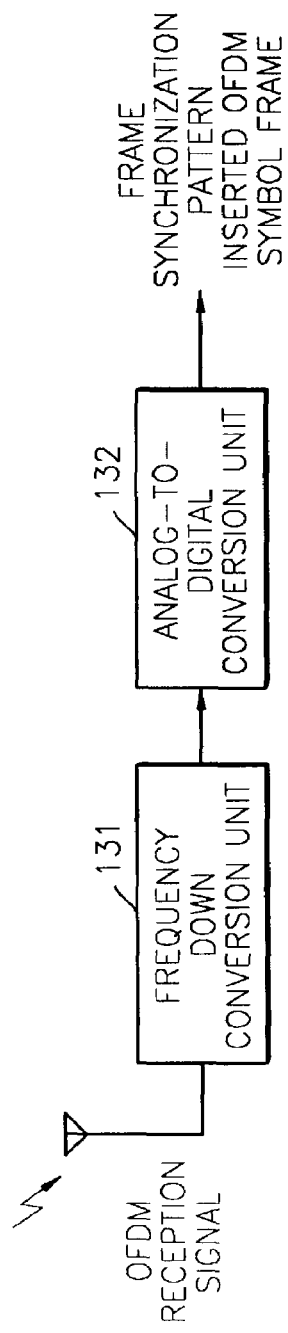
FIG. 13 is a detailed diagram of the structure of a frame synchronization pattern inserted OFDM symbol frame conversion unit.

FIG. 13 is a detailed diagram of the structure of the frame synchronization pattern inserted OFDM symbol frame conversion unit 121 which converts the high frequency analog OFDM transmission signal, which is transmitted by the OFDM transmitter, into a low-frequency digital signal.

A frequency down conversion unit 131 converts the high frequency signal into a base band frequency signal when the OFDM receiver receives the OFDM transmission signal from the OFDM transmitter. An analog-to-digital conversion unit 132 converts the OFDM transmission signal that is an analog signal and is converted into the low frequency signal, into a digital signal as the source data format. The output of the analog-to-digital conversion unit 132 is the frame synchronization pattern inserted OFDM symbol frame.

Figure 14:
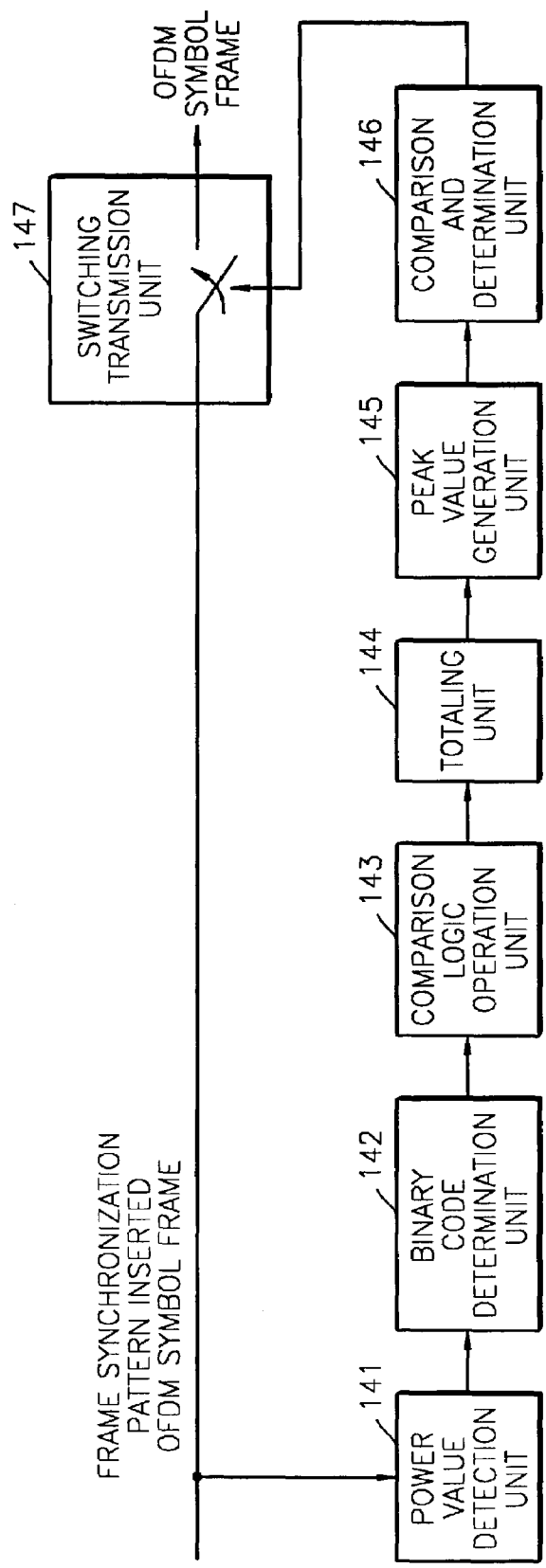
FIG. 14 is a detailed diagram of the structure of a frame synchronization pattern detection unit.

FIG. 14 is a detailed diagram of the structure of the frame synchronization pattern detection unit 122 which detects the frame synchronization pattern in the frame synchronization pattern inserted OFDM symbol frame, and sends only the OFDM symbol frame to the next module. This forms one of the core concepts of the present invention.

A power value detection unit 141 detects the power value of the frame synchronization pattern inserted OFDM symbol frame. With this value, the frequency and phase offset problem can be solved. That is, the value $I^2+Q^2$ that is the power value of the receiving signal channel I and channel Q of the OFDM symbol frame always has the same value regardless of the frequency and phase offsets by the following principles. Assuming that the transmission signal of the real number part is A and the signal of the imaginary number part is B, the transmission signal can be expressed by the following equation 1:

$$A+B_j \quad (1)$$

Here, if there are frequency offset $\Delta\omega$ and phase offset $\Delta\theta$, the equation 1 can be expressed as the following equation 2:

$$(A+jB)e^{j(\Delta\omega t+\Delta\theta)} \quad (2)$$

Here, if replacement of $\Theta=\Delta\omega t+\Delta\theta$ is performed, the equation 2 can be expressed as the following equation 3:

$$(A\cos\Theta - B\sin\Theta) + j(B\cos\Theta + A\sin\Theta) \quad (3)$$

If $I^2+Q^2$ is calculated for the real number part (I) and imaginary number part (Q) in the equation 3, a signal which has no relation with the frequency and phase offsets is finally obtained as the following equation 4:

$$(A^2\cos^2\Theta + B^2\sin^2\Theta) - 2AB\cos\Theta\sin\Theta + (B^2\cos^2\Theta + A^2\sin^2\Theta) + 2AB\cos\Theta\sin\Theta = A^2 + B^2 \quad (4)$$

Figure 15:
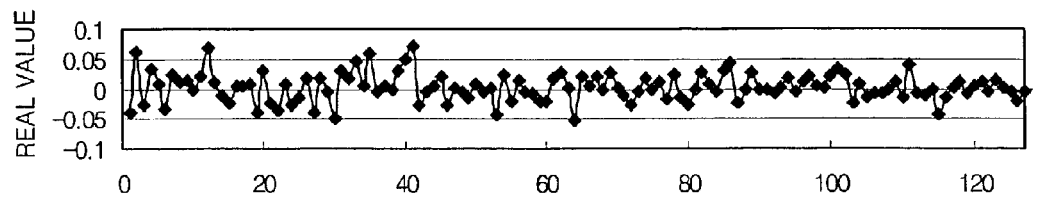
FIGS. 15(a) and 15(b) are graphs showing the reception characteristics of channel I and channel Q.
Figure 15:
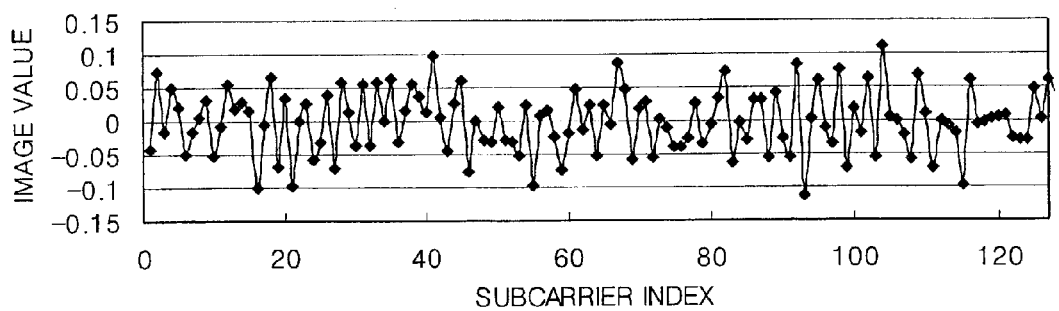

FIGS. 15(a) and 15(b) are graphs showing the reception characteristics of channel I and channel Q.

The simulation environment includes signal sample interval=0.045 μsec (microsecond), and SNR=5 dB (where SNR stands for signal-to-noise ratio and where dB stands for decibels). In the model, the channel has two paths, and it is assumed that the relative delay of the second path compared with the first path=3 μsec, the relative power of the second path=−6 dB, and the relative frequency offset=0.5. By multi-path fading, the reception characteristics of channels I and Q are distorted.

Figure 16:
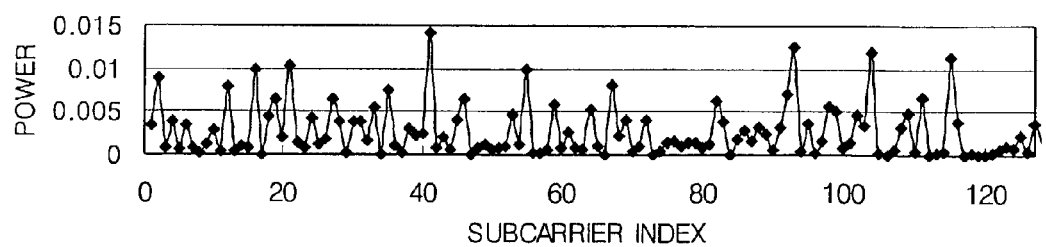
FIG. 16 is a graph of resulting values when $I^2+Q^2$ is employed.

FIG. 16 is a graph of resulting values when $I^2+Q^2$ is employed for the above signal.

A binary code determination unit 142 determines the binary pattern (1 or 0) of a received signal, by selecting an appropriate threshold $Th_1$. By obtaining a bit error probability according to changes in the $Th_1$ value, the threshold $Th_1$ is determined. The error probability that 1 is transmitted and is determined as 0 and the error probability that 0 is transmitted and is determined as 1 are obtained respectively. By adding the two error probabilities, a total error probability is obtained. A total error probability having the lowest value is determined as the threshold $Th_1$.

Figure 17:
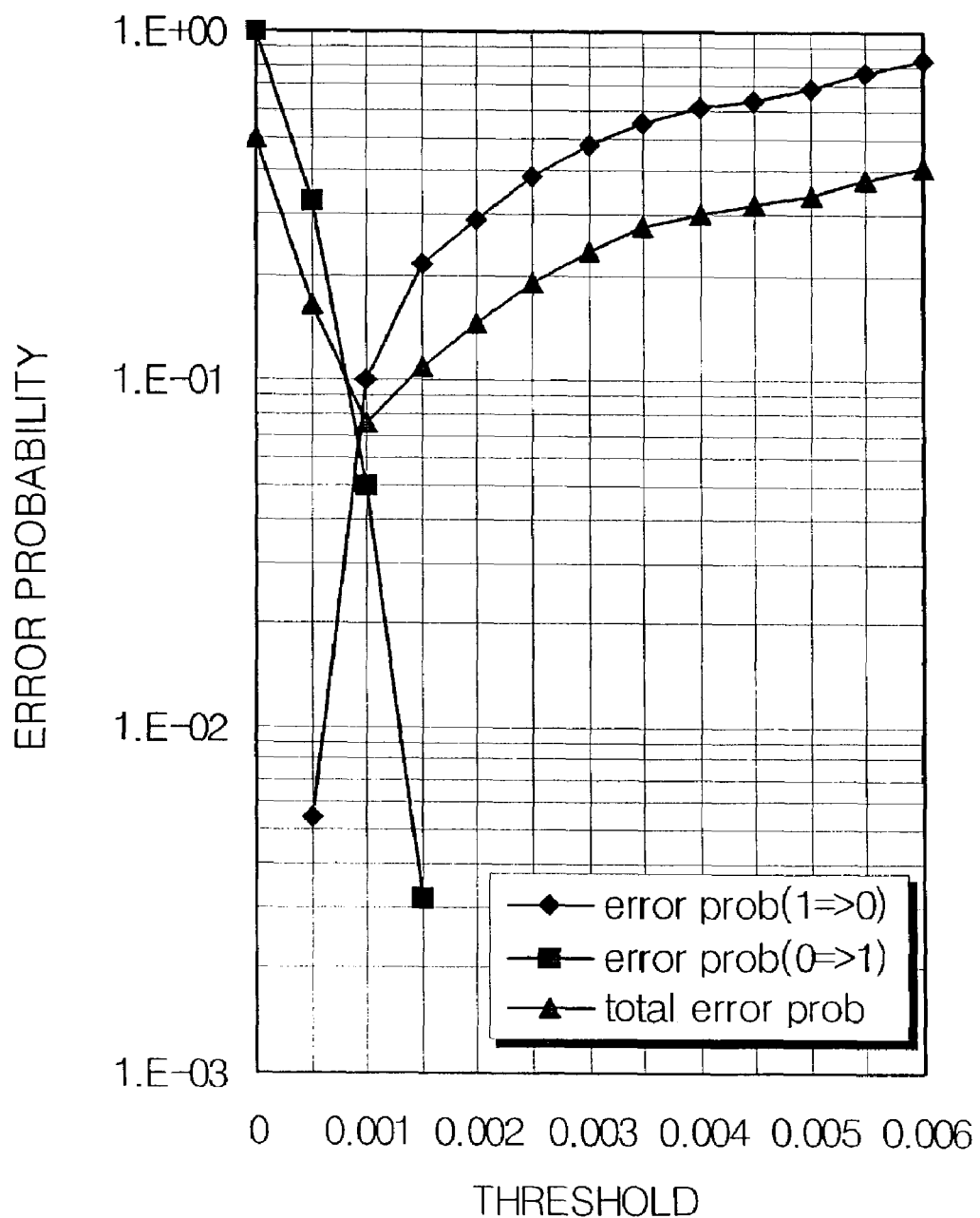
FIG. 17 is a graph showing a total error probability as an example of determining threshold $Th_1$.

FIG. 17 is a graph showing a total error probability as an example of determining threshold $Th_1$.

That is, the graph shows the error probability that 1 is determined as 0, the error probability that 0 is determined as 1, and the total error probability adding the two error probabilities, based on the $Th_1$ value in an environment where the delay of the second path is 3 μsec and the power gain of the second path is −6 dB. As shown in FIG. 17, when $Th_1$ is 0.001, the total error probability becomes the minimum and this is determined as the threshold $Th_1$.

Figures 18, 19:
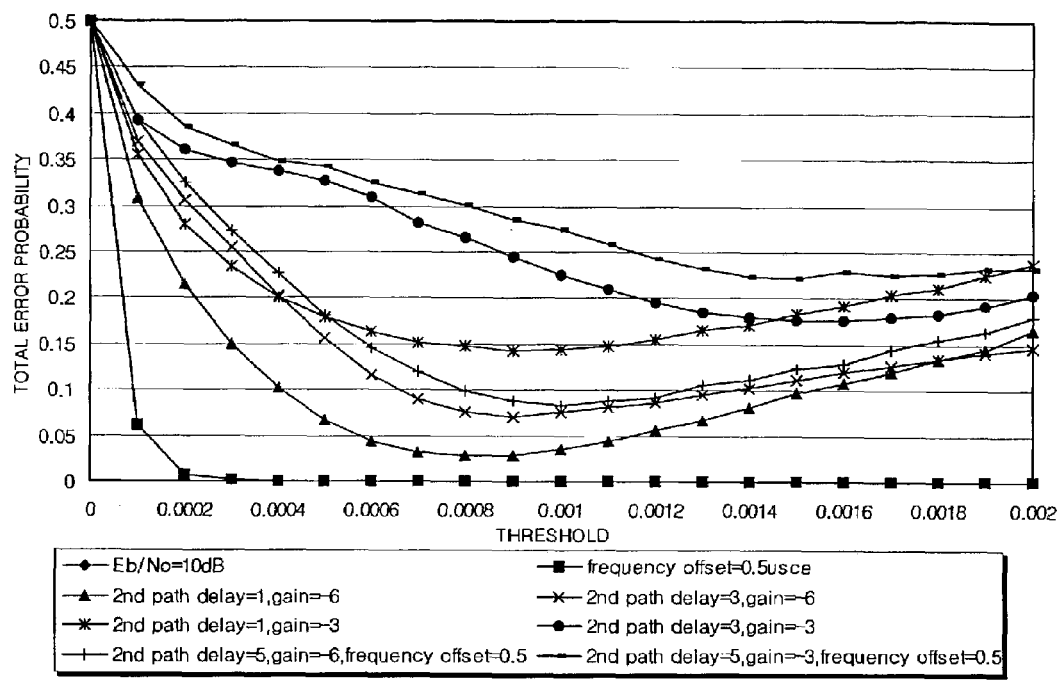
FIG. 18 is a graph showing a total error probability under a variety of channel environments.
FIG. 19 is a table for a comparison logic operation.

FIG. 18 is a graph showing a total error probability under a variety of channel environments.

Considering a channel environment to which the OFDM communications system is applied, $Th_1$ is determined as 1. A comparison logic operation unit 143 performs a comparison logic operation for an interval corresponding to the length of the frame synchronization pattern, using the respective sample streams of the binary signals determined as described above, and the frame synchronization pattern that the reception terminal has already known.

FIG. 19 is a table for the comparison logic operation.

If the two numbers are the same, such as 1 and 1, or 0 and 0, 1 is output, and if the two number are different, such as 1 and 0, or 0 and 1, −1 is output. A totaling unit 144 obtains the total of the output values. A peak value generation unit 145 outputs a peak value corresponding to the maximum length of the frame synchronization pattern if a signal having no error is received, and outputs a peak value obtained by subtracting 2 from the maximum peak value whenever an error of 1 sample occurs for a frame synchronization pattern interval.

Figure 20:
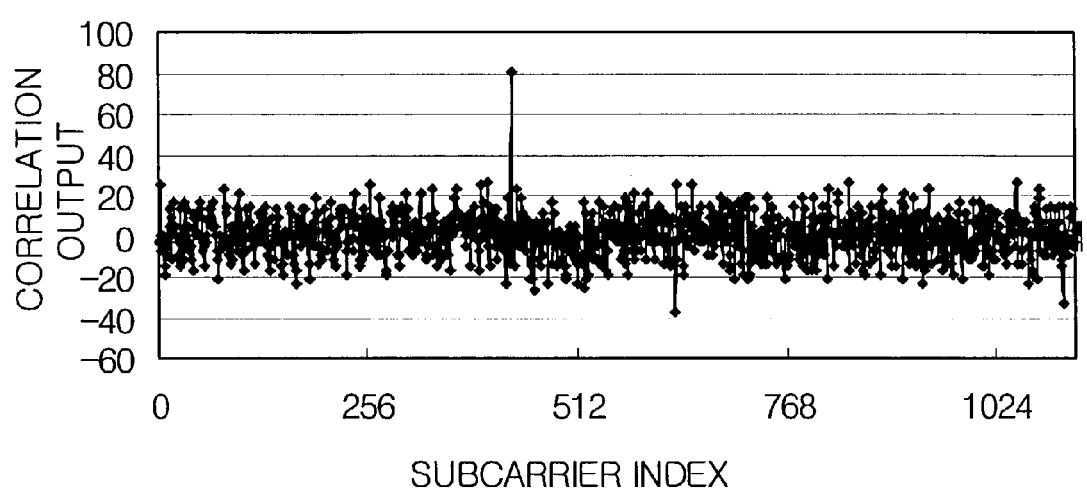
FIG. 20 is a graph showing the characteristic of correlation detection.

FIG. 20 is a graph showing the characteristic of correlation detection obtained by making the signal of FIG. 16 pass through the frame synchronization pattern detection unit of FIG. 14.

As shown in FIG. 20, the maximum peak value is 81. This means 23 errors occurred in the 127-bits-long frame synchronization pattern region and the peak value decreased by 23×2. After an appropriate threshold 2 is set as $Th_2$ for detecting the frame synchronization pattern that is the starting point of a symbol frame, a comparison determination unit 146 determines a symbol frame starting point if a peak value that is bigger than the threshold is output. The determination of the threshold $Th_2$ is also important because if the threshold $Th_2$ is set to a too high value, when many errors are in the received frame synchronization pattern, the frame may not be detected. If the threshold $Th_2$ is set to a too low value, other points may be wrongfully detected as a starting point of the frame. Accordingly, the threshold $Th_2$ is determined appropriately based on the two probabilities. In the same context, when a safer performance of frame detection is required, the length of the frame synchronization pattern can be extended so that a bigger peak value can be output.

When the frame synchronization pattern that is the starting point of the frame is thus determined, a switching transmission unit 147 sends only the original OFDM symbol frame, excluding the frame synchronization pattern, to the next module, by turning on a switch for the OFDM symbol frame interval. The output of the switching transmission unit becomes the OFDM symbol frame.

Figure 21:
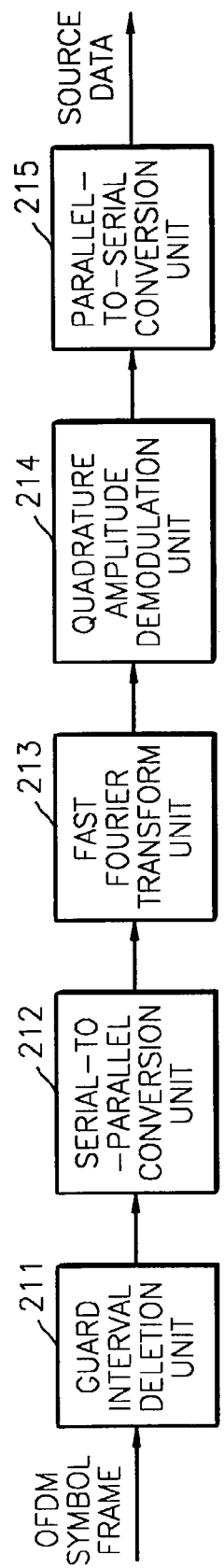
FIG. 21 is a detailed diagram of the structure of a source data generation unit.

FIG. 21 is a detailed diagram of the structure of a source data generation unit 123 which generates the original source data input by the user, by performing fast Fourier transform and quadrature amplitude demodulation on the OFDM symbol frame.

A guard interval deletion unit 211 deletes the guard interval in the OFDM symbol frame. A serial-to-parallel conversion unit 212 converts the signal, in which the guard interval is deleted, from a serial signal into a parallel signal in order to process the received signal at a high speed. A fast Fourier transform unit 213 restores the parallel signal that is IFFT transformed in the transmitter, to the original state, by performing fast Fourier transform. Likewise, a quadrature amplitude demodulation unit 214 performs quadrature amplitude demodulation on the FFT transformed signal is that was quadrature amplitude modulated in the transmitter, in order to restore the original state. A parallel-to-serial conversion unit 215 converts the parallel data into serial data in order to restore the original data format. The output of the parallel-to-serial conversion unit 215 is the source data that the user of the receiver desires to receive.

Figure 22:
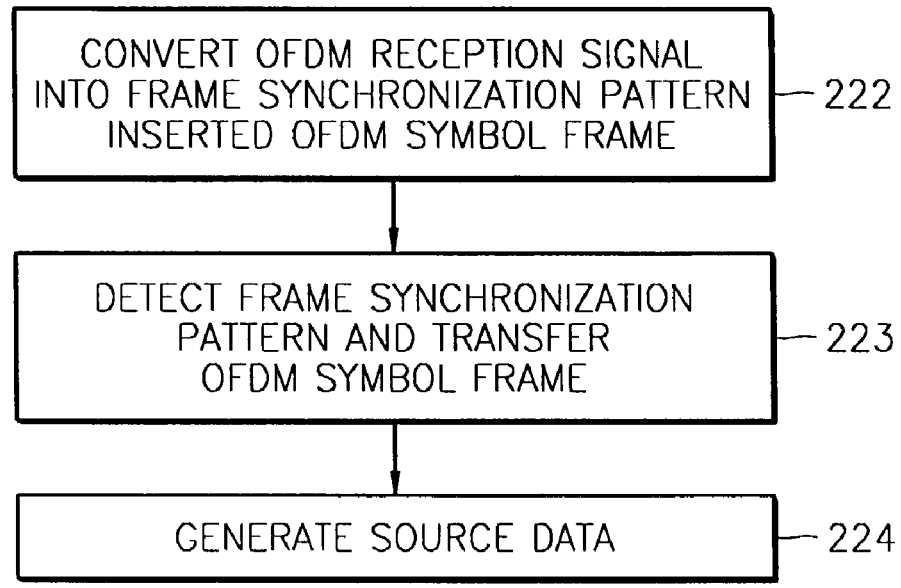
FIG. 22 is a flowchart of a process for synchronizing an OFDM receiver symbol frame.

FIG. 22 is a flowchart of a synchronization process by the receiver in which the frame synchronization pattern is detected and symbol frame synchronization between the OFDM transmitter and receiver is performed.

When the high frequency analog OFDM transmission signal transmitted by the OFDM transmitter is sensed by the OFDM receiver, the high frequency analog OFDM transmission signal is converted into a low frequency digital signal that can be processed in the receiver in step 222. The frame synchronization pattern is detected from the OFDM symbol frame into which the frame synchronization pattern is inserted, and only the OFDM symbol frame excluding the frame synchronization pattern is sent to the next module in step 223. The original source data that are input by the user are regenerated, by performing fast Fourier transform, quadrature amplitude demodulation, and other processes on the OFDM symbol frame in step 224.

Figure 23:
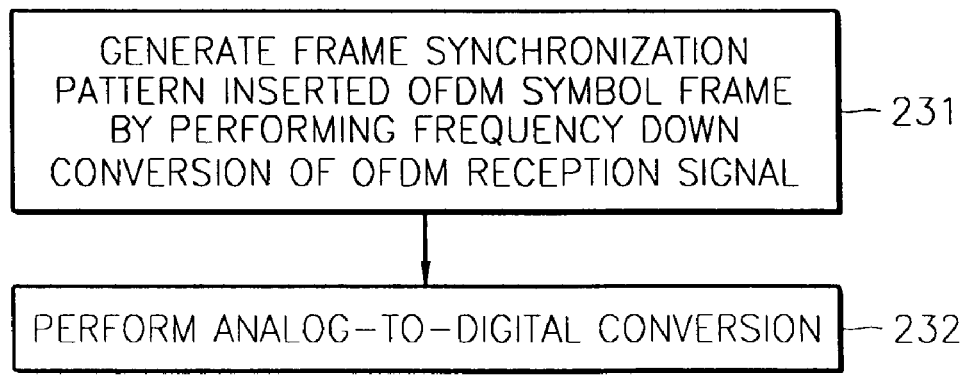
FIG. 23 is a flowchart of a process for converting a frame synchronization pattern inserted OFDM symbol frame.

FIG. 23 is a detailed flowchart of the step 222 for converting the high frequency analog OFDM transmission signal transmitted by the OFDM transmitter into a low frequency digital signal.

When the antenna of the OFDM receiver receives the OFDM transmission signal from the OFDM transmitter, the high frequency signal is converted into a low frequency signal that is a substantial data frequency in step 231. The OFDM transmission signal that is converted into the low frequency signal is converted from the analog signal into a digital signal as the source data format in step 232. The digital signal is the OFDM symbol frame into which the frame synchronization pattern is inserted.

Figure 24:
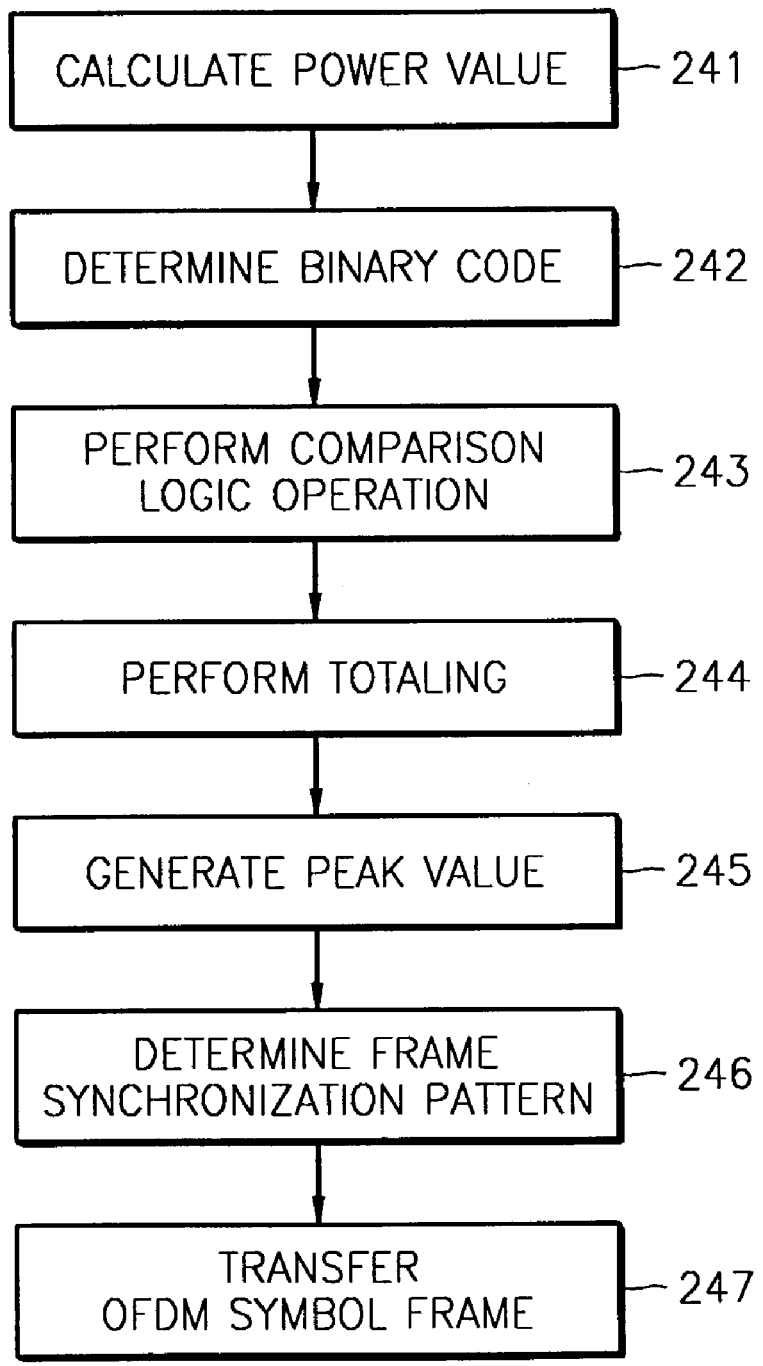
FIG. 24 is a detailed flowchart of a process for detecting a frame synchronization pattern.

FIG. 24 is a detailed flowchart of the step 223 in which the frame synchronization pattern is detected from the OFDM symbol frame into which the frame synchronization pattern is inserted, and only the OFDM symbol frame excluding the frame synchronization pattern is sent to the next module.

First, the power value of the OFDM symbol frame into which the frame synchronization pattern is inserted is detected in step 241. Here, an appropriate threshold $Th_1$ is selected and the binary pattern (1 or 0) of the received signal is determined in step 242. Comparison logic operations on the respective sample streams of the determined binary signals and the frame synchronization pattern that the receiving terminal has already known are performed for an interval corresponding to the length of the frame synchronization pattern in step 243. The total of the output values of the comparison logic operations is obtained in step 244. A peak value which is obtained by subtracting 2 from a maximum peak value whenever an error of 1 sample occurs in the frame synchronization pattern interval is output in step 245. After an appropriate threshold $TH_2$ is set, if a peak value that is bigger than the threshold $TH_2$ when compared is output, it is determined as the starting point of the symbol frame in step 246. By turning on a switch for the OFDM symbol frame interval, only the original OFDM symbol frame excluding the frame synchronization pattern is sent to the next module in step 247. The sent signal becomes the OFDM symbol frame.

Figure 25:
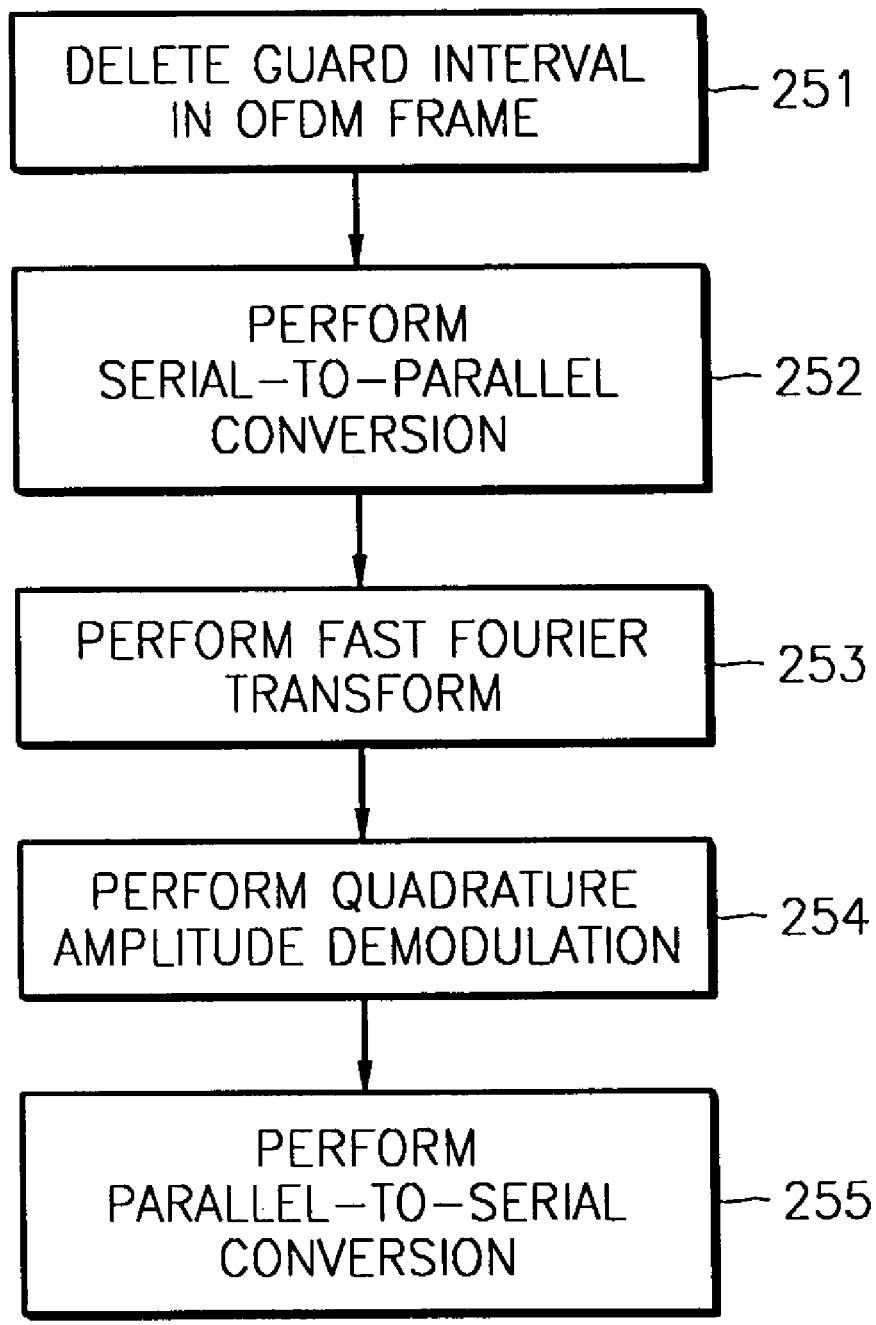
FIG. 25 is a detailed flowchart of a process for generating source data.

FIG. 25 is a detailed flowchart of the step 224 for generating the original source data that are input by the user, by performing fast Fourier transform, quadrature amplitude demodulation, and other processes on the OFDM symbol frame.

The guard interval is deleted from the OFDM symbol frame in step 251. The signal in which the guard interval is deleted is converted from a serial signal to a parallel signal in step 252. Fast Fourier transform is performed on the parallel signal that is IFFT transformed in the transmitter to restore the original state in step 253. In order to restore the original state, quadrature amplitude demodulation is performed on the signal that was quadrature amplitude modulated in the transmitter in step 254. In order to restore the original data format, the parallel data is converted into serial data in step 255. The serial signal is the source data that the user of the receiver desires to receive.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.), optically readable media (e.g., CD-ROMs (compact disc-read-only memory), DVDs (digital versatile discs), etc.), system memory (read-only memory, random access memory), flash memory, and carrier waves (e.g., transmissions over the Internet).

Figure 26:
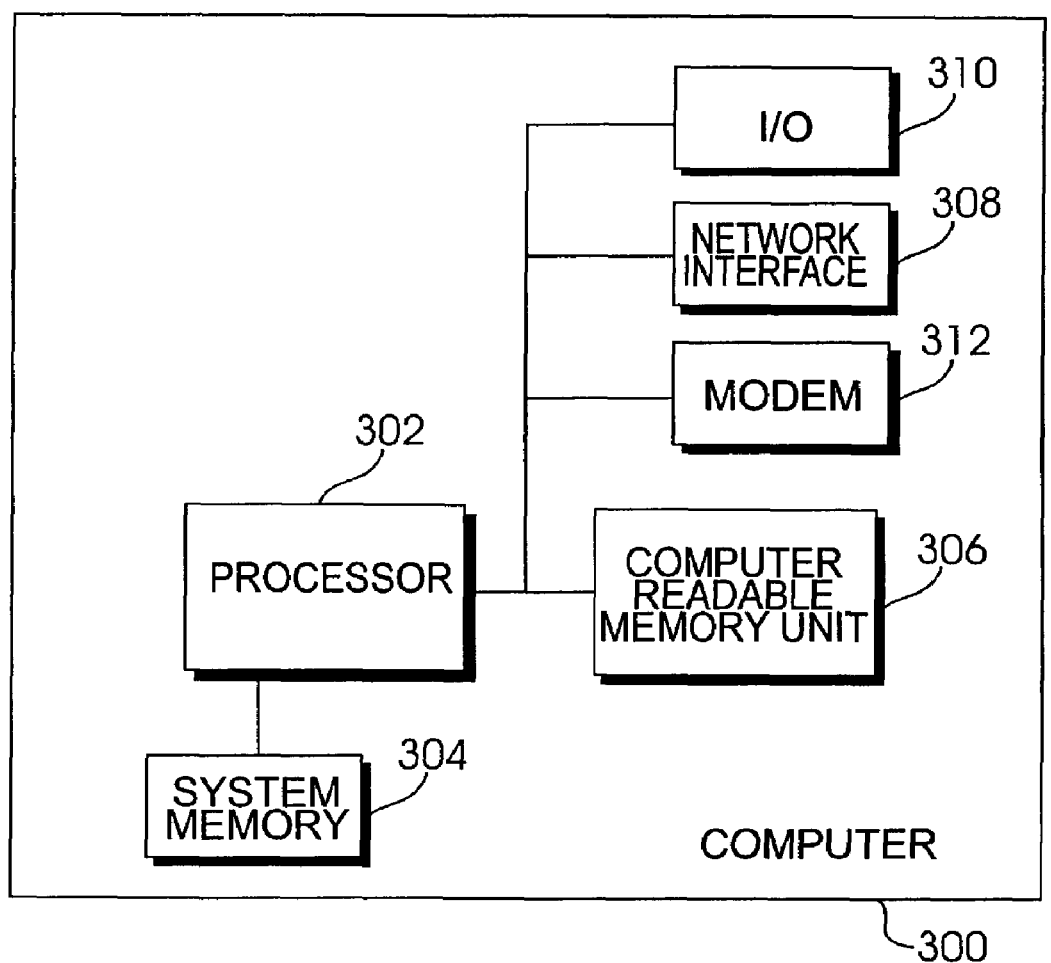
FIG. 26 is an example of a computer that can read computer readable recording media.

An example of a computer that can read computer readable recording media is shown in FIG. 26. The computer 300 includes a processor 302 that controls the computer 300. The processor 300 uses the system memory 304 and a computer readable memory device 306 that includes certain computer readable recording media. A system bus connects the processor 302 to a network interface 308, modem 312 or other interface that accommodates a connection to another computer or network such as the Internet. The system bus may also include an input and output interface 310 that accommodates connection to a variety of other devices.

Optimum embodiments have been explained above and are shown. However, the present invention is not restricted to the above-described embodiments and many variations are possible within the spirit and scope of the present invention. The scope of the present invention is not determined by the above description but by the accompanying claims.

Overcoming the conventional notion depending on the prior art OFDM symbol standards, the OFDM symbol frame start detection method according to the present invention places a free-length code pattern, which is separately generated in a time domain, in the starting point of a frame and detects this pattern such that accuracy and efficiency greatly improve.

Also, since the power value of a received signal is detected in the method, the communications system operates regardless of the frequency offset and phase offset. In addition, since a free-length pattern can be designed, the start point of a frame can be accurately detected in a seriously fading channel, by detecting a maximum peak based on correlation.

With the frame synchronization code pattern, a variety of synchronization elementary technologies such as DC offset remover, and automatic gain control (AGC) can be applied additionally.

What is claimed is:

1. An apparatus for symbol frame synchronization of an orthogonal frequency division multiplexing transmitter comprising:

an orthogonal frequency division multiplexing symbol frame generating unit generating an orthogonal frequency division multiplexing symbol frame from source data;

a frame synchronization pattern insertion unit generating a frame synchronization pattern and inserting the pattern in the front part of the orthogonal frequency division multiplexing symbol frame; and an orthogonal frequency division multiplexing transmission signal conversion unit converting the orthogonal frequency division multiplexing symbol frame, into which the frame synchronization pattern is inserted, into an orthogonal frequency division multiplexing transmission signal, wherein the frame synchronization pattern insertion unit comprises:

a code selection unit selecting a binary code having a high correlation characteristic and adjusting the length of the binary code according to the state of a channel environment;

an alternative inversion unit keeping a value 0 without change and performing alternative inversion on a value 1 so that the polarity of the 1 becomes opposite to the polarity of an immediately preceding 1;

a normalization unit generating the frame synchronization pattern by normalizing the alternatively inverted binary code; and a switching insertion unit inserting the frame synchronization pattern in the front part of the orthogonal frequency division multiplexing symbol frame through switching.

2. The apparatus of claim 1, wherein the orthogonal frequency division multiplexing symbol frame generating unit comprises:

a serial-to-parallel conversion unit converting the source data from serial data to parallel data;

a quadrature amplitude modulation unit performing quadrature amplitude modulation on the parallel signal;

an inverse fast Fourier transform unit performing an inverse fast Fourier transform on the quadrature amplitude modulated signal;

a parallel-to-serial conversion unit converting the inverse fast Fourier transformed signal from a parallel signal to a serial signal; and a guard interval insertion unit generating an orthogonal frequency division multiplexing symbol frame by generating a guard interval and inserting the guard interval into the serial signal.

3. The apparatus of claim 1, wherein the orthogonal frequency division multiplexing transmission signal conversion unit comprises:

a digital-to-analog conversion unit converting the orthogonal frequency division multiplexing symbol frame, into which the frame synchronization pattern is inserted, from a digital signal to an analog signal; and a frequency up conversion unit converting the analog signal to an orthogonal frequency division multiplexing transmission signal through a frequency up conversion.

4. An apparatus for symbol frame synchronization of an orthogonal frequency division multiplexing receiver, comprising:

a frame synchronization pattern inserted orthogonal frequency division multiplexing symbol frame conversion unit converting an orthogonal frequency division multiplexing reception signal into an orthogonal frequency division multiplexing frame, into which a frame synchronization pattern is inserted;

a frame synchronization pattern detection unit detecting the frame synchronization pattern and sending the orthogonal frequency division multiplexing symbol frame excluding the frame synchronization pattern; and a source data generation unit generating source data from the orthogonal frequency division multiplexing symbol frame, wherein the frame synchronization pattern detection unit comprises:

a power value detection unit obtaining a power value by adding the square of the real number part and the square of the imaginary number part of the orthogonal frequency division multiplexing symbol frame into which the frame synchronization pattern is inserted;

a binary code determination unit determining a binary code by comparing the power value with a threshold value 1 that has a minimum value of a sum obtained by adding a probability that when value 1 is transmitted, the value 1 is determined as value 0, and a probability that when value is transmitted, the value 0 is determined as value 1;

a comparison logic operation unit performing a logic operation such that when the binary code is compared with an already known frame synchronization pattern, when the values are the same, 1 is output and when the values are different, -1 is output;

a totaling unit totaling the resulting values of the comparison logic operations;

a peak value generation unit generating a peak value obtained by subtracting a predetermined value from the totaled value whenever an error occurs;

a comparison determination unit comparing the peak value with a second threshold set by a user, and when the peak value is greater than the second threshold, determining a frame synchronization pattern from the orthogonal frequency division multiplexing symbol frame into which the frame synchronization pattern is inserted; and a switching transmission unit sending the orthogonal frequency division multiplexing symbol frame excluding the frame synchronization pattern through switching.

5. The apparatus of claim 4, wherein the frame synchronization pattern inserted orthogonal frequency division multiplexing symbol frame conversion unit comprises:

a frequency down conversion unit performing frequency down conversion on the orthogonal frequency division multiplexing reception signal; and an analog-to-digital conversion unit converting the frequency down converted signal into an orthogonal frequency division multiplexing symbol frame, into which a frame synchronization pattern is inserted, by converting the analog signal into a digital signal.

6. The apparatus of claim 4, wherein the source data generation unit comprising:

a guard interval deletion unit deleting a guard interval in the orthogonal frequency division multiplexing symbol frame;

a serial-to-parallel conversion unit converting the guard interval deleted signal from a serial signal into a parallel signal;

a fast Fourier transform unit performing a fast Fourier transform on the parallel signal;

a quadrature amplitude demodulation unit performing quadrature amplitude demodulation on the fast Fourier transformed signal; and a parallel-to-serial conversion unit generating source data by converting the quadrature amplitude demodulated signal from a parallel signal to a serial signal.

7. An apparatus for symbol frame synchronization of an orthogonal frequency division multiplexing transmitter and receiver comprising:

a symbol frame synchronization unit of an orthogonal frequency division multiplexing transmitter generating an orthogonal frequency division multiplexing symbol frame from source data, inserting a frame synchronization pattern into the orthogonal frequency division multiplexing symbol frame and transmitting the orthogonal frequency division multiplexing frame, with the symbol frame synchronization unit comprising a frame synchronization pattern insertion unit that comprises:

a code selection unit selecting a binary code having a high correlation characteristic and adjusting the length of the binary code according to the state of a channel environment;

an alternative inversion unit keeping a value 0 without change and performing alternative inversion on a value 1 so that the polarity of the 1 becomes opposite to the polarity of an immediately preceding 1;

a normalization unit generating the frame synchronization pattern by normalizing the alternatively inverted binary code; and a switching insertion unit inserting the frame synchronization pattern in the front part of the orthogonal frequency division multiplexing symbol frame through switching; and a symbol frame synchronization unit of an orthogonal frequency division multiplexing receiver receiving the transmitted signal, detecting the frame synchronization pattern, and generating source data form the orthogonal frequency division multiplexing symbol frame.

* * * * *